Figure 1:
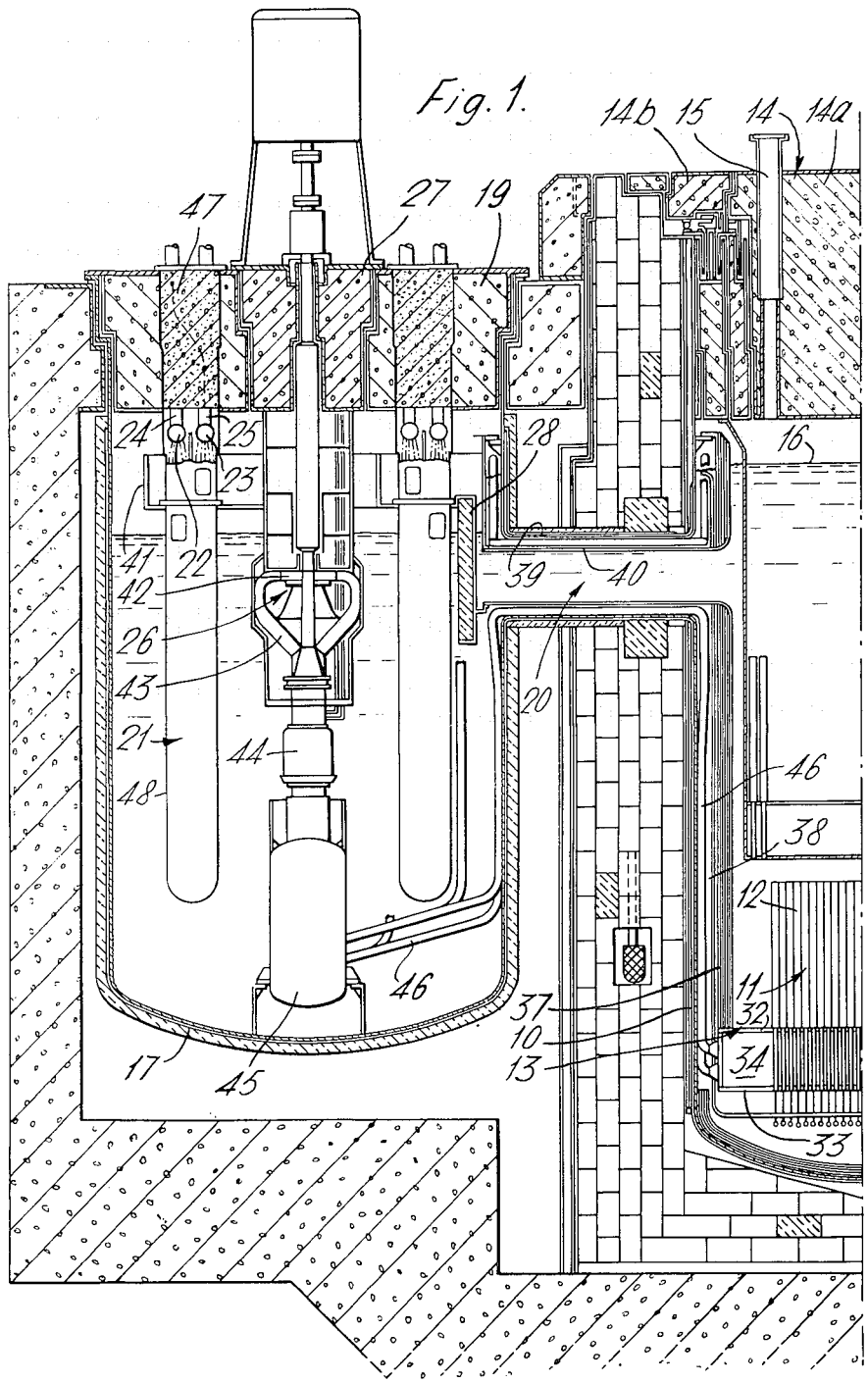

March 29, 1966  W. G. HUTCHINSON ETAL  3,242,981
NUCLEAR REACTOR HEAT EXCHANGERS
Filed Nov. 19, 1962  4 Sheets-Sheet 1

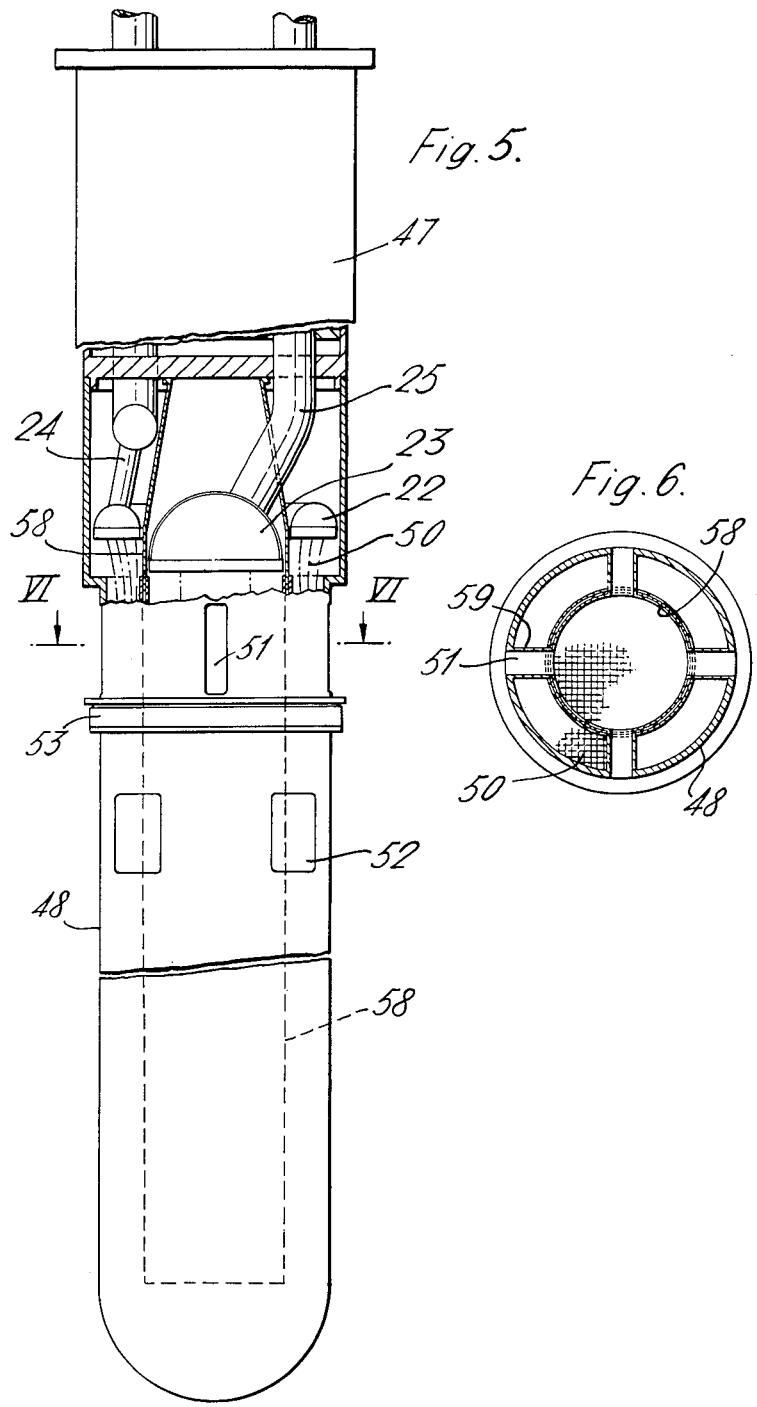

United States Patent Office 3,242,981
Patented Mar. 29, 1966

3,242,981
NUCLEAR REACTOR HEAT EXCHANGERS
William George Hutchinson, Appleton, and Owen Hayden, Bolton, England, assignors to United Kingdom Atomic Energy Authority, London, England
Filed Nov. 19, 1962, Ser. No. 238,409
Claims priority, application Great Britain, Oct. 17, 1962, 39,278/62
6 Claims. (Cl. 165—67)

The present invention relates to heat exchangers and is concerned more particularly with the provision of a heat exchanger system suitable for nuclear reactors, especially those of the kind in which the coolant for the reactor core is a liquid and in which a cycle for such coolant is open to a coolant reservoir. A leading example of a nuclear reactor with this sort of open coolant cycle is a fast reactor in which the core and primary heat exchangers are immersed in the coolant reservoir, the coolant being a liquid metal such as sodium or an alloy thereof with potassium.

Nuclear reactor heat exchangers should, if at all possible, be removable for the purposes of renewal in the event of improper functioning or the occurrence of a fault. This makes desirable the sub-division of a heat exchanger system into a number of self-contained sections so that the bulk to be handled in any one removal operation is reduced and also so that enough heat exchanger capacity may be left undisturbed to allow the reactor to be kept on load if required while renewal is being undertaken. Increasing sub-division, however, tends to complicate the arrangements for feeding the heat exchanger system with hot primary coolant from the core and hence tends to aggravate the problem of making joints which can be released without direct manipulation for the removal of a section. It has to be borne in mind that there will be a radioactive hazard at the site of these joints which makes human access practically impossible. These conditions also favour construction of maximum simplicity so as to minimise the room for failure.

According to the present invention there is provided a shell and tube heat exchanger system comprising a header for receiving a primary coolant and provided with apertures, several individual elongated shell units insertable through the apertures to a position projecting downwardly from the header such that the units are replaceable individually, each unit having an inlet opening adapted to register internally of the header in the downwardly projecting position of the unit for flow of the primary coolant therethrough, means to seal the units in passage through the header apertures against loss of primary coolant, and secondary coolant conducting means in each unit comprising an inlet and an outlet at the header end of the unit and tubing progressing from the other end of the unit to the outlet for counterflow heat exchange between the primary and secondary coolants. The co-operative relationship of the individual units with the common header thus enables the units simply to be slid in and out. Remotely operable adjustment may be desirable for the sealing means and can be embodied in the form of a linkage which is actuable to displace a sealing ring, having a sealed relationship with the respective unit, into obturating engagement over the header aperture. In the case where the units are immersed in a coolant reservoir, as in the type of fast reactor previously referred to, the duty expected of the sealing means need only be the control of leakage rather than complete exclusion.

Figure 2:
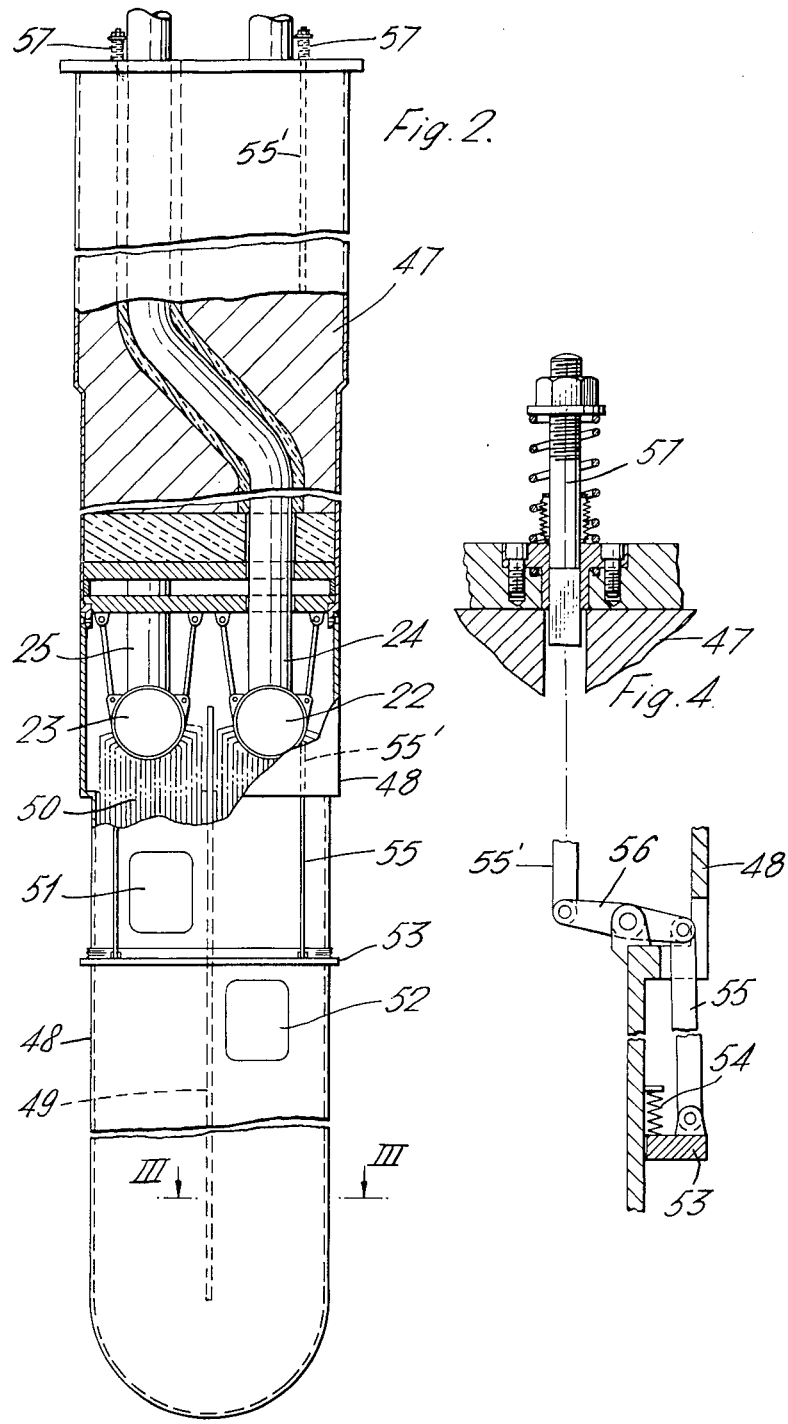
Figure 3:
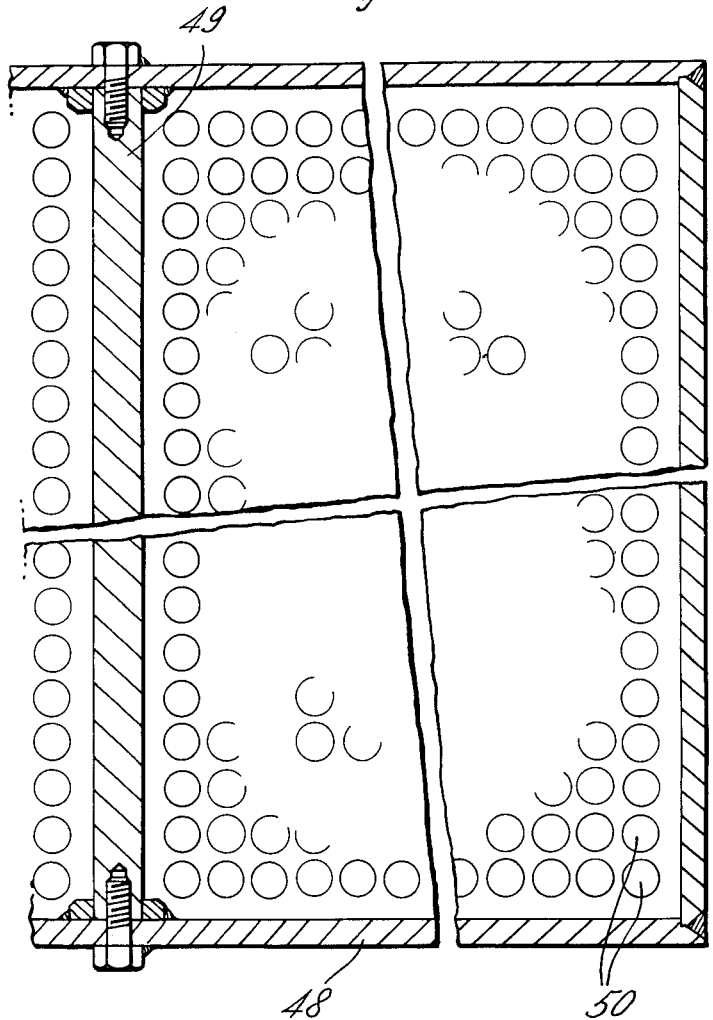

Other aspects and features of the invention will emerge from the following description of particular embodiments which are taken by way of example, these embodiments being illustrated in the accompanying drawings, in which:

FIGURE 1 shows, to one side of the vertical centre line, a section through the core and one of the heat exchangers of a nuclear reactor, FIGURE 2 is a view, partly in section, of a heat exchanger unit as included in the heat exchanger appearing in FIGURE 1, FIGURE 3 is a cross section at the line III—III of FIGURE 2 to an enlarged scale, FIGURE 4 shows a detail of attachments on the unit of FIGURES 2 and 3 for providing a seal with the header, FIGURE 5 is a view, partly in section, of a second form of heat exchanger unit, and FIGURE 6 is a cross section at the line VI—VI of FIGURE 5.

The reactor as illustrated is a fast reactor in which the core coolant is a liquid metal such as sodium or an alloy of sodium with potassium.

In FIGURE 1 there is centrally situated a core tank 10 in the lower half of which is supported a core 11 composed of closely packed fuel element assemblies, such as 12, which stand upright on a grid 13 together with breeder element assemblies of similar shape constituting a surrounding breeder blanket. A top closure for the core tank is constituted by an eccentric rotating shield arrangement indicated generally 14 having, in known manner, an inner shield 14a with an eccentric fuelling bore 15 fitted rotatably in an eccentric bore of a larger, outer shield 14b which is rotatable about the core tank centre line. Liquid metal coolant fills the core tank up to a level which in operation of the reactor at full coolant flow lies just below the top closure, as indicated at 16, so as to leave over the core an ample depth of coolant for fuel element assemblies drawn clear of the core to remain immersed, even when the level falls back to the position at shut-down of the reactor. Over the free surface of the liquid metal coolant is maintained an appropriately pressurised atmosphere of a cover or blanket gas, such as argon or nitrogen.

In a ring around the core tank are disposed symmetrically four heat exchanger tanks, such as the one designated 17 appearing in FIGURE 1, the other three being of identical construction. The top closure of each of these tanks is in the form of a stepped plug 19, which is conveniently of metal clad concrete. Interconnecting the core tank with each of the heat exchanger tanks are coaxially arranged inner and outer ducts extending radially of the core tank with their axes in a common horizontal plane at a level below the liquid metal coolant level 16, such ducting being designated generally 20. Each heat exchanger is composed of a ring of shell and tube units 21 (to be described in greater detail subsequently) which receive hot liquid metal coolant in their shells for heat exchange to a secondary coolant, usually of the same composition as the core or primary coolant, which is fed through the tubes from inlet and outlet headers 22 and 23 having respective pipe connections 24 and 25 following a tortuous path to the exterior of the tank. These pipe connections established respectively with lagged ducting (not shown) a secondary coolant circuit to secondary heat exchangers (not shown) in which steam is raised for driving prime movers. A pump 26 of the centrifugal type is carried dependently by an insert shielding plug 27 which is fitted removably into a corresponding aperture penetrating the main plug 19 from one side to the other in such a position that the pump is situated centrally within the ring of heat exchanger units but is eccentric relative to the tank centre in a direction away from the core tank in order that the opening represented by the coaxial ducting 20 may be masked by a block of neutron shielding material 28.

Within the core tank 10 two horizontal support plates 32 and 33 forming part of the grid 13 are spaced apart to define an inlet plenum 34. The space below the lower support plate 33 receives leakage from the inlet plenum past plug-shaped ends of the fuel element assemblies inserted into holes in the lower support plate and since, as will be more fully described later, the delivery of the pumps is passed into the inlet plenum for forcing through the core, a hydrostatic pressure is set up acting downwards on the ends of the fuel element assemblies in order to prevent levitation by the upward flow through the core.

Also within the core tank, a thermal shield 37 stands on the plate 32 and by extending upwards to above the liquid metal coolant level 16 forms a barrier separating the core and coolant above it from a space 38 extending over the full expanse of the interior surfaces of the core tank. It is into this space 38 that the outer ducts 39 of the coaxial ducting 20 open. The inner duct, indicated 40, penetrates the thermal shield 37 at one end and at the other end opens into an open-topped trough 41 so that hot coolant leaving the core is passed to the heat exchanger units without coming into contact with the walls of the tank. The trough has an annular shape corresponding to the ring of heat exchangers and has a deep pocket at one side to connect with the inner duct 40. The floor of the trough should lie below the common coolant level in the absence of pumping power in order that the circuit for natural convection flow is not interrupted.

The core coolant circuit is as follows: Starting from the inlet plenum, the coolant flows through the core 11 and from thence through the inner duct 40 to the shells of the primary heat exchanger units 21; after heat exchange to the secondary coolant, it is discharged from the heat exchanger shells to the heat exchanger tank for intermixing with the reservoir of coolant held in common by the several tanks. Through an impeller casing 42 open directly at its inlet to the interior of the heat exchanger tank, the pump 26 draws coolant from the common reservoir and delivers it through an outlet manifold 43 and a non-return valve 44 to an outlet header 45 from whence the delivery is conducted through an array of pipes 46 to the inlet plenum 34 beneath the reactor core, these pipes being laid along a variety of paths so as to pass through the outer duct 39 of the coaxial ducting 20 and the space 38 within the core tank.

For a fuller description of the reactor as a whole, reference should be made to the copending application Serial No. 238,440 of John Laithwaite, Leslie Cole and George Hutchinson of the same date as the present application.

Dealing now more specifically with the heat exchanger arrangement, the unit construction according to FIGURES 2 and 3 has an individual stepped insert shield plug 47 of generally rectangular section carrying dependently a thimble-shaped shell 48 of similar section, the shell being divided transversely into two halves by a longitudinally extending division plate 49 terminating somewhat short of the lower rounded end of the shell so that a tube bundle 50 extending down the shell on one side of the plate 49 from the inlet header 22 can be turned through 180° at the bottom of the shell and ascend on the other side of the plate 49 to the outlet header 23.

For these units, the trough 41, which acts as a primary coolant header, has spaced apertures in its floor through which the heat exchanger units are insertable. The tank plug 19 is also apertured to receive the plugs 47 of the individual units. Interconnections of the units for establishing the secondary coolant circuit are made externally of the heat exchanger tank so that such interconnections are demountable to enable any one unit to be removed if the need arises.

From the core coolant header trough 41, the shell of each unit receives hot coolant through an inlet opening 51 adapted to register within the depth of the trough and discharges it, after passage through the shell, from an outlet opening 52 into the coolant reservoir in the heat exchanger tank. For controlling leakage of hot coolant from the header trough through the apertures in which the units are inserted (bearing in mind that the unit is positioned from its shield plug some considerable distance above) a sealing ring having a sealed relationship with the unit is displaceable for obturating engagement over the header aperture. As illustrated more particularly in FIGURE 4, such a ring 53 has a metal bellows 54 sealing its inner edge to the shell 48 of the unit and has a radial width sufficient to span the clearance of the header aperture about the shell. A linkage 55 and 55′, including a rocker 56 in the region where the linkage enters the interior of the shell above the liquid metal coolant level, is actuable by a screw and nut adjustment 57 at the top of the plug 47 to move the sealing ring up or down so that it can be brought into engagement with the header trough floor to obturate the aperture.

Since the shells of the heat exchanger units are immersed in common reservoir coolant, thermal insulation of the shells may be necessary in order to reduce wasteful heat transfer to the reservoir coolant to acceptable limits if the same reduction is unobtainable by other design features. A modification of the invention to counter such wasteful transfer lies in a heat exchanger comprising a shell, a tubular division plate dividing a major portion of the length of the shell into an inner region and an annular surrounding region, a tube bundle describing a re-entrant path through the annular region and back through the inner region, and means to admit primary coolant for flow first through the inner region and then through the annular region. In this way the temperature gradient across the shell to the reservoir coolant is reduced by the temperature lost in heat transfer in the inner region and accordingly there is less wastage to the reservoir coolant.

The embodiment of this further aspect in one particular form appears in the unit construction according to FIGURES 5 and 6. Here the division plate as seen at 58 is an open-ended cylinder, the open end of this cylinder being spaced from the lower end of the shell 48, so that, as before, the tube bundle 50 can be turned beneath it. In this case the inlet header 22 is a ring header and the tube bundle extends therefrom down the annular space defined between the shell 48 and the cylinder 58 and up inside the cylinder to the outlet header 23. As best seen in the plan view of FIGURE 6, the inlet openings 51 for the entry of core coolant into the units are in this case short ducts, such as 59, which extend between the shell and the cylinder at four equispaced points so that the entering coolant proceeds first in the inner region within the cylinder.

A modification in the unit of FIGURES 5 and 6 is the circular section, the apertures in the plug 19 and the header trough 41, as also the sealing arrangement 53, being modified accordingly.

A further measure advantageously taken against wastage of primary coolant heat to the reservoir is the placing of the header trough 41 with its floor above the level of the coolant reservoir in the heat exchanger tank under full coolant flow conditions. This feature relies on the fact that at full coolant flow the level in the heat exchanger tanks will be depressed relative to the level above the core, whereas with pumping power absent the restoration of all the free surfaces to the common level can bring the free surfaces in the heat exchanger tanks above the header trough floors so that natural convection can take place.

Other shell and tube arrangements for the heat exchanger units are possible within the scope of the invention; for example, a once-through flow path for the primary coolant may be adopted, if necessary by making each shell in a U configuration with one of the limbs shorter and open-ended for the discharge of the primary coolant below the level of the header. For such a shell to be insertable through the header there would have to be a large aperture in the latter corresponding in size to the dimension transversely of the whole shell. The obturation of the aperture may be achieved by means of a flat plate carried by the shell.

It is preferred that the secondary circuit pipework is so arranged that the several heat exchanger units in each tank are connected singly or in groups to different steam generators, thus creating the situation whereby each steam generator receives its feed of secondary coolant from all the tanks. Consequently any loss of cooling capacity resulting from a steam generator becoming defective is shared between the heat exchanger tanks and temperature transients arising in the primary circuit are therefore less severe.

What we claim is:

1. For installation in a tank, a shell and tube heat exchanger system comprising a top closure plug for the tank having apertures penetrating therethrough, insert plugs locatable respectively in the closure plug apertures, a header disposed beneath the closure plug for receiving a primary coolant and having a base provided with apertures in positions corresponding to the closure plug apertures, an elongated shell unit carried dependently by each insert plug and extending with a clearance fit through a respective header aperture, such unit having an inlet opening adapted to register internally of the header when the respective insert plug is located in the closure plug and an outlet opening externally of the header to define a downward flow pass for the primary coolant through the unit, means to seal each unit against passage through the header apertures of primary coolant, and secondary coolant conducting means for each unit comprising an inlet and an outlet at the plug end of the unit, inlet and outlet pipework extending respectively to the inlet and outlet through the respective insert plug, and tubing connected to the inlet and having a run progressing in the aforesaid downward pass from the other end of the unit to the outlet for counterflow heat exchange between the primary and secondary coolants.

2. A shell and tube heat exchanger system according to claim 1, wherein the sealing means for each unit comprises a sealing ring extending around the unit in a sealed relationship and displaceable relative to the unit in the longitudinal direction for obturating engagement over the respective header aperture, and linkage having an actuating station at the top of the respective inert plug and being adapted for adjustably displacing the sealing ring.

3. A shell and tube heat exchanger system comprising a header for receiving a primary coolant and having a base and each extending through a respective aperture gated shell units projecting downwardly from the header base and each extending through a respective aperture with a clearance fit such that the units are replaceable individually, dividing means extending longitudinally within each unit to a level close to the lower end thereof whereby to define a re-entrant path for primary coolant flow through the unit from an inlet opening adapted to register internally of the header in the downwardly projecting position of the unit to an outlet opening disposed adjacent to but externally of the header, means to seal the units against passage through the header apertures of primary coolant, and secondary coolant conducting means in each unit comprising an inlet and an outlet both at the header end of the unit, and tubing connected between the inlet and outlet and following the re-entrant path defined by the division means.

4. A shell and tube heat exchanger system according to claim 3, wherein the dividing means is a tubular division plate to divide the interior of the unit into inner and outer legs of the re-entrant path, the inlet opening into the unit being in communication with the inner leg and the outlet opening being in communication with the outer leg.

5. For installation in a tank, a shell and tube heat exchanger system comprising a top closure plug for the tank having apertures penetrating therethrough, insert plugs locatable respectively in the closure plug apertures, a header disposed beneath the closure plug for receiving a primary coolant and having a base provided with apertures in positions corresponding to the closure plug apertures, an elongated shell unit carried dependently by each insert plug and extending with a clearance fit through a respective header aperture, a tubular division plate extending longitudinally within each unit to a level close to the lower end thereof to divide the interior of the unit into an inner region and a surrounding outer region, each unit having an inlet opening adapted to register internally of the header when the respective insert plug is located in the closure plug and to direct incoming primary coolant into the inner region and having also an outlet opening adapted to discharge the primary coolant from the surrounding outer region adjacent to but externally of the header, a sealing ring extending around each unit in a sealed relationship and displaceable relative to the unit in the longitudinal direction for obturating engagement over the respective header aperture, linkage having an actuating station at the top of each insert plug and being adapted for adjustably displacing the respective sealing ring, and secondary coolant conducting means for each unit comprising an inlet and an outlet at the plug end of the unit, inlet and outlet pipework extending respectively to the inlet and outlet through the respective insert plug, and tubing following a re-entrant path by progressing from the inlet down the outer region, under the lower end of the division plate and up the inner region to the outlet.

6. A shell and tube heat exchanger system comprising a header for receiving a primary coolant and having a base provided with apertures, several individual elongated shell units projecting downwardly from the header base and each extending through a respective aperture with a clearance fit such that the units are replaceable individually, each unit having an inlet opening adapted to register internally of the header and an outlet opening disposed externally of the header to define a downward flow pass for the primary coolant through the unit, means to seal the units against passage through the header apertures of primary coolant, and secondary coolant conducting means in each unit comprising an inlet and an outlet at the header end of the unit and tubing connected to the inlet and having a run in the aforesaid downward pass from the other end of the unit to the outlet for counterflow heat exchange between the primary and secondary coolants.

References Cited by the Examiner

UNITED STATES PATENTS

| | | | |
|---|---|---|---|
| 1,374,682 | 4/1921 | Reid | 158—1.5 |
| 1,795,027 | 3/1931 | Hume | 158—1.5 |
| 1,810,286 | 6/1931 | MacPhee | 165—158 X |
| 2,468,903 | 5/1943 | Villiger | 165—160 X |
| 2,573,504 | 10/1951 | Solie | 277—10 |
| 2,774,575 | 12/1956 | Walter | 165—160 X |
| 3,000,728 | 9/1961 | Long et al. | 165—74 X |

ROBERT A. O'LEARY, *Primary Examiner.*

CHARLES SUKALO, *Examiner.*

A. W. DAVIS, *Assistant Examiner.*